United States Patent [19]
Exsted et al.

[11] Patent Number: 6,063,484
[45] Date of Patent: *May 16, 2000

[54] THERMALLY INDUCED PHASE SEPARATED AZLACTONE MEMBRANE

[75] Inventors: Bert J. Exsted, Stillwater; Steven L. Kangas, Woodbury, both of Minn.

[73] Assignee: 3M Innovative Properties Company, Saint Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,681

[22] Filed: Dec. 23, 1997

Related U.S. Application Data

[60] Division of application No. 08/464,795, Jun. 26, 1995, Pat. No. 5,750,245, which is a continuation-in-part of application No. 08/011,366, Jan. 29, 1993, abandoned.

[30] Foreign Application Priority Data

Jan. 28, 1994 [EP] European Pat. Off. ............... 94907369
Jan. 28, 1994 [WO] WIPO ...................... PCT/US94/01062

[51] Int. Cl.$^7$ ....................................................... B32B 3/10
[52] U.S. Cl. ...................... 428/315.5; 264/41; 428/315.7
[58] Field of Search .............................. 428/315.5, 315.7; 264/41

[56] References Cited

U.S. PATENT DOCUMENTS

| | | | |
|---|---|---|---|
| 4,539,256 | 9/1985 | Shipman | 428/315.5 |
| 4,737,560 | 4/1988 | Heilmann et al. | 526/304 |
| 4,868,222 | 9/1989 | Chau et al. | 521/61 |
| 4,871,824 | 10/1989 | Heilmann et al. | 526/304 |
| 5,200,100 | 4/1993 | Kapuscinski et al. | 252/47.5 |

FOREIGN PATENT DOCUMENTS

| | | |
|---|---|---|
| 0 105 666 | 4/1984 | European Pat. Off. . |
| 0 392 735 | 10/1990 | European Pat. Off. . |
| 0 392 783 | 10/1990 | European Pat. Off. . |
| WO 94/00464 | 1/1994 | WIPO . |

OTHER PUBLICATIONS

"Polyazlactones," *Encyclopedia of Polymer Science and Engineering*, vol. 11, Second Edition, (1988) pp. 558–571.
Chapter: Billmeyer, jr., "Polymer Structure and Physical Properties," *Textbook of Polymer Science*, Third Edition, (1984) pp. 330–357.
Chapter: Battaerd et al., "IV. Properties of Block and Graft Copolymers," *Graft Copolymers*, (1967) pp. 209–210.

*Primary Examiner*—Jenna Davis
*Attorney, Agent, or Firm*—Paul W. Busse; James A. Rogers; Philip Y. Dahl

[57] ABSTRACT

The present invention provides a microporous material or a membrane in which the membrane includes an azlactone moiety which is blended with or grafted to a thermoplastic polymer to provide a porous material having an internal structure characterized by a multiplicity of spaced, randomly disposed, non-uniform shaped, equiaxed particles of the polyazlactone polymer/thermoplastic polymer blends or the azlactone-graft copolymer. Each of the adjacent particles throughout the material are separated from one another to provide said material with a network of interconnected micropores and each of the particles are connected to each other by a plurality of fibrils. In addition to unmodified azlactone membranes, membranes which have been modified by subsequent reaction of the azlactone moiety with a suitable nucleophile are also included within the scope of the present invention. Preferred nucleophiles capable of reacting with an azlactone membrane of this invention include biologically significant nucleophiles such as amines, thiols and alcohols as well as amino acids, nucleic acids and proteins.

4 Claims, 1 Drawing Sheet

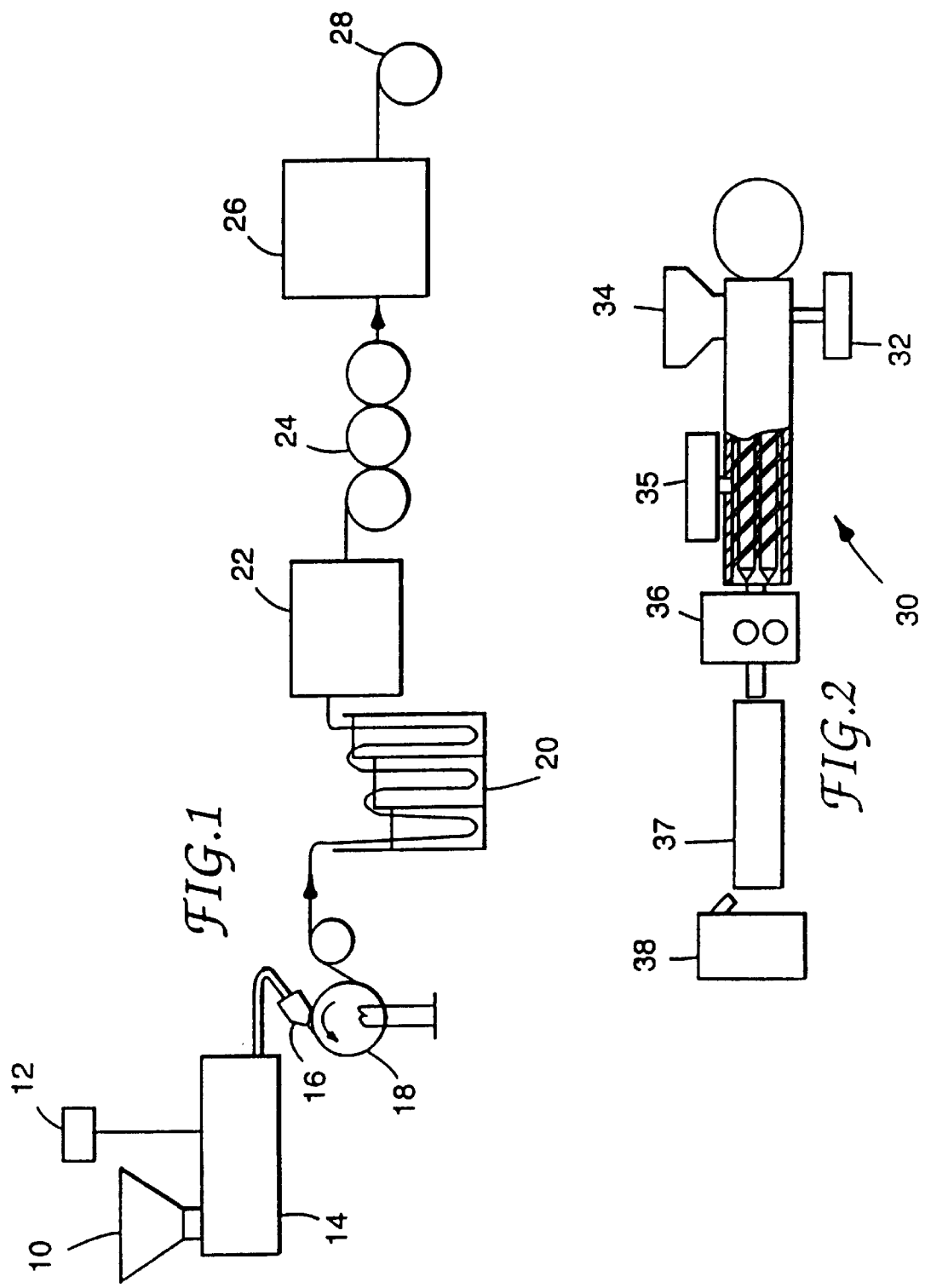

THERMALLY INDUCED PHASE SEPARATED AZLACTONE MEMBRANE

This application is a divisional application of U.S. application Ser. No. 08/464,795, filed Jun. 26, 1995, now U.S. Pat. No. 5,750,245, which is a continuation-in-part of U.S. application Ser. No. 08/011,366, filed Jan. 29, 1993, now abandoned.

The present invention is generally related to azlactone modified polymeric membranes and is more particularly related to a thermally induced, phase separated polymeric membrane containing an azlactone moiety which was added to the polymer by extrusion grafting or blending. The thermally induced, phase separated azlactone polymeric membranes are suitable for use in a variety of separation and chromatographic applications.

BACKGROUND

Polymeric supports which have been modified to include an azlactone moiety may be useful for a number of applications. The capability of the azlactone moiety to covalently bind a variety of biologically significant or useful materials to a polymer have allowed the use of azlactone-modified polymers as complexing agents, enzymes, catalysts, polymeric reagents, and chromatographic supports as well as other types of activated supports.

Methods to make azlactone-modified polymers are known. For example, EP 0 392 735 published Oct. 17, 1990 reports suitable methods for attaching an azlactone moiety to a polymer, preferably a polymeric support such as a bead or membrane. The reported processes to produce azlactone modified polymers or polymeric supports include mixing a suitable alkenyl azlactone monomer with a polymer-producing monomer and copolymerizing the mixture of monomers under conditions which do not compromise the reactive properties of the azlactone portion of the resulting copolymer.

Another reported method of attaching an azlactone moiety to a polymeric support involves coating the surface of a polymerized substrate with an azlactone reagent. Reported processes provide a polymer having an azlactone moiety being covalently attached or bound to outer surfaces of the polymeric support. The covalent attachment of the azlactone moiety to the polymer avoids problems typically associated with surface coatings which are not bound to the polymer surface such as leaching of the coating from the polymer surface during the use of the coated polymer.

Another process for attaching an azlactone moiety to a polymeric support is reported in EP 0 392 783 published Oct. 17, 1990. In this report, a monomeric 2-alkenyl azlactone moiety was extrusion grafted to a polyolefin base polymer. The process to prepare such a graft copolymer involved contacting a polyolefin base polymer with a free radical initiator system to give an activated polymer and then reacting the activated polymer with a monomeric alkenyl azlactone moiety. The graft copolymer prepared by the above process provided a polymeric support that had modified surfaces when compared to the base polymer and which retained the desired physical and chemical properties of the azlactone moiety. The reported azlactone graft copolymer may be extruded, formed or molded into a variety of configurations such as beads, pellets, strips, films, or wells and may be used in diverse applications such as thermoplastic adhesives and tie layers for barrier films. In addition, the azlactone moiety may be reacted with nucleophilic reagents such as proteins and other biologically active reagents. The covalent attachment of biological reagents to the polymeric support through the grafted azlactone moiety allows use of the graft copolymers in separation and chromatographic applications.

Microporous films or membranes are one specialized type of material which has potential application in a number of separation or chromatographic uses such as analysis of air, microbiological products, intravenous fluids or vaccines. A specific type of microporous film or membrane is reported in U.S. Pat. No. 4,539,256 to Shipman. This patent reports a microporous film or sheet material that has a microporous structure characterized by having a multiplicity of spaced, randomly dispersed, equiaxed, non-uniformly shaped particles of polymeric material that are connected to each other by a plurality of three-dimensionally dispersed polymeric fibrils.

A method of making this type of microporous film is also reported in U.S. Pat. No. 4,539,256. Briefly, the method of making such a microporous film involves melt blending a crystallizable thermoplastic polymer with a compound which is miscible with the polymer at the melting temperature of the polymer but that phase separates at a temperature at or below the crystallization temperature of the polymer. After the formation of the melt-blend, it is shaped into an article and the article is then cooled to a temperature at which the polymer crystallizes and causes phase separation to occur between the polymer and the compound to give a two phase article. The compound used to form the melt-blend is extracted or removed from the shaped article. Finally, the article is then oriented or stretched in a least one direction to give a network of particles interconnected with fibrils throughout the article.

Although the reported process of Shipman provides a specialized microporous structure, the process requires that the polymer used must be at least partially crystallizable and must be capable of phase separating from a readily removed compound which is used to form the requisite melt-blend. Thus, not all polymeric materials may be used with the reported process to prepare membranes. Importantly, factors or processes expected to destroy or markedly effect the crystallinity of a polymeric material would not be expected to provide suitable polymeric materials for use in the process reported by Shipman.

SUMMARY OF THE INVENTION

In spite of an expected detrimental effect on the crystallinity properties of a base polymer caused by either grafting or blending processes, the present invention provides a unique microporous membrane material formed from an azlactone-modified thermoplastic composition.

In one embodiment, a microporous material or membrane is produced from an alkenyl azlactone moiety which is grafted onto a crystallizable thermoplastic polyolefin to provide a porous material having an internal structure characterized by a multiplicity of spaced, randomly disposed, non-uniformly shaped, equiaxed particles of the azlactone graft copolymer. Each of the adjacent particles throughout the material are separated from one another to provide the material with a network of interconnected micropores. In addition, each of the particles are connected to each other by a plurality of fibrils.

In another embodiment, a microporous material or membrane having substantially the same properties as those listed above is produced from a polyazlactone homopolymer or copolymer which is extrusion blended with a crystallizable thermoplastic polyolefin.

Preferred alkenyl azlactone monomers suitable for use in extrusion grafting or for use in preparing polyazlactone homopolymers or copolymers suitable for use in extrusion blending include a compound or monomer of the formula

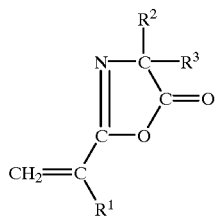

where $R^1$ is hydrogen or methyl and where $R^2$ and $R^3$ are, independently, alkyl having 1–14 carbon atoms, cycloalkyl having 3–14 carbon atoms, aryl having 5–12 carbons atoms, arenyl having 6–26 carbons atoms and 0–3 sulfur, nitrogen, and nonperoxidic oxygen atoms, or $R^2$ and $R^3$ taken together with the carbon atom to which they are attached form a carbocyclic ring having 4–12 carbon atoms. A highly preferred alkenyl azlactone monomer is vinyl dimethyl azlactone.

Preferred base polymers for use in this invention include polyolefins such as polyethylene, polypropylene and polymethylpentene. A highly preferred polymer is high density polyethylene.

In addition to azlactone-modified membranes having an intact azlactone moiety bound to the base polymer, membranes which have been modified by subsequent reaction of the azlactone moiety with a suitable nucleophile are also included within the scope of the present invention. Preferred nucleophiles capable of reacting with an azlactone membrane of this invention include biologically significant nucleophiles such as amines, thiols and alcohols as well as amino acids, nucleic acids and proteins. Particular preferred nucleophiles are biological active proteins such as antigens and antibodies.

Grafted or blended azlactone thermoplastic compositions are believed to produce a microporous material or a membrane containing grafted azlactone monomer or blended polyazlactone polymer distributed throughout the bulk of membrane rather than being distributed only on accessible, exposed or outer surfaces of the membrane. The distribution of the azlactone moiety throughout the bulk of the membrane is also believed to increase the available active sites on the membrane which provides a substantial increase in the binding capacity of the membrane for a variety of useful reagents.

BRIEF DESCRIPTION OF THE DRAWINGS

FIG. 1 is a schematic diagram of the process steps used to prepare a membrane of this invention.

FIG. 2 is a schematic diagram of an extrusion blending process using a twin screw extruder.

DETAILED DESCRIPTION

The present invention provides an azlactone membrane having a network of spaced, randomly disposed, non-uniformly shaped, equiaxed particles interconnected with a plurality of fibrils to provide a network of interconnected particles containing dialkylazlactone moieties extrusion grafted to or blended with a crystallizable thermoplastic polymer.

Suitable extrusion grafted azlactone thermoplastic compositions for use in this invention may be made according to the process reported in EP 0 392 783 which is incorporated by reference herein for the purpose of describing methods of preparing azlactone graft copolymers. Briefly, a suitable polyolefin resin such as high density polyethylene, polypropylene or polymethylpentene is mixed with a free radical initiator, such as a peroxide or azo initiator, and the mixture is heated in an extruder at a temperature sufficient to break down the initiator and produce free radicals. The free radical initiator is selected from a variety of known compounds based on the properties of the polyolefin resin and the amount of added free radical initiator is selected to provide for sufficient grafting without causing undesired side reactions such as cross-linking of the polyolefin resin. Typical amounts of free radical initiator used to graft a vinyl dialkylazlactone to a polyolefin resin are about 0.01–0.25 weight percent.

The free radicals produced then extract hydrogen atoms off of the polyolefin resin. As the polyolefin resin loses hydrogen radicals, the polyolefin resin is activated and may undergo several subsequent reactions such as crosslinking with other base polymers, degradation, oxidation or, significantly, reaction with a suitable alkenyl monomer. In the formation of the azlactone graft copolymer, after the polyolefin resin is activated, a vinyl dialkylazlactone monomer such as vinyl dimethyl azlactone is injected into the extruder. The injected vinyl azlactone monomer then covalently binds to the activated polyolefin resin and may be used to form a membrane.

As is reported in EP 0 392 783, the vinyl azlactone copolymer is susceptible to hydrolysis. Therefore, the grafting process and reaction are preferably done in the absence of water in an inert atmosphere or an unreactive environment. Use of these conditions prevents the azlactone from degrading and prevents side reactions from interfering with the grafting or addition of the vinyl azlactone monomer to the polyolefin resin.

Suitable extrusion blended azlactone thermoplastic compositions for use in the this invention may be prepared according to the processes reported in pending U.S. patent application Ser. No. 08/119,036 filed Sep. 9, 1993, which is incorporated by reference in the present application for the purposes of describing the preparation of blended azlactone thermoplastic compositions. Melt blending of polyazlactone homopolymers or copolymers with thermoplastic polymers is an alternative to the extrusion graft process described above. When polyazlactone polymers are melt blended with thermoplastic polymers, a two phase, incompatible blended product usually results. This incompatibility generally does not have deleterious properties of incompatible compositions due to the ability of azlactone-functionality to react with desired biological ligands.

As described in the cited application, polyazlactone blends may be prepared from any thermoplastic polymer that is non-reactive with an azlactone monomer. Examples of thermoplastic polymers suitable for melt blending with polyazlactone homopolymers or copolymers include polyamides (e.g., nylon 6), polyurethanes, polyacrylates, polymethacrylates, polystyrene, polyolefins, ethylene-vinyl acetate copolymers, poly(N-vinyl lactams) (e.g., polyvinylpyrrolidone), polyvinyl acetates, polyoxyalkylenes, styrene-acrylonitrile copolymers, polyphenylene oxides, and polycarbonates (polyvinyl alcohol homopolymers and copolymers are not suitable because the hydroxy groups can react with azlactone). These thermoplastic polymers may be homopolymers or copolymers. Thermoplastic copolymers may include azlactone copolymers, such as graft copolymers reported in U.S. Pat.

No. 5,013,795 to Coleman et al. and bulk copolymers reported in U.S. Pat. No. 4,695,608 to Engler et al.

Polyazlactone polymers may be any compound containing or comprising at least one azlactone moiety. Preferred polyazlactone polymers are homopolymers of 2-alkenyl azlactone monomers. Suitable 2-alkenyl azlactone monomers are known compounds, their synthesis being described for example in U.S. Pat. Nos. 4,304,705; 5,081,197 and 5,091,489 all to Heilmann et al. Suitable 2-alkenyl azlactones include:
2-ethenyl-4,4-dimethyl-1,3-oxazolin-5-one,
2-isopropenyl-4,4-dimethyl-1,3-oxazolin-5-one,
2-ethenyl-4-methyl-4-ethyl-1,3-oxazolin-5-one,
2-isopropenyl-4-methyl-4-butyl-1,3-oxazolin-5-one,
2-ethenyl-4,4-dibutyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one,
2-isopropenyl-4,4-tetramethylene-1,3-oxazolin-5-one,
2-ethenyl-4,4-diethyl-1,3-oxazolin-5-one,
2-ethenyl-4-methyl-4-nonyl-1,3-oxazolin-5-one,
2-isopropenyl-4-methyl-4-phenyl-1,3-oxazolin-5-one,
2-isopropenyl4-methyl-4-benzyl-1,3-oxazolin-5-one,
2-ethenyl-4,4-pentamethylene-1,3-oxazolin-5-one, and
2-ethenyl-4,4-dimethyl-1,3-oxazolin-6-one. Most preferred 2-alkenyl azlactones include 2-ethenyl-4,4-dimethyl-1,3-oxazolin-5-one (VDM) and 2-isopropenyl-4,4-dimethyl-1,3-oxazolin-5-one. Other azlactone monomers include the 2-(4-alkenylphenyl)-5-oxazolones reported in U.S. Pat. No. 5,039,813.

If a polyazlactone copolymer is to be formed, a comonomer having similar or different chemical or physical properties may be included, depending on the desired characteristics for the copolymer to be blended. Nonlimiting examples of comonomers useful to be copolymerized with azlactone moieties to form copolymers include methyl methacrylate, vinyl acetate, vinyl aromatic monomers, alpha,beta-unsaturated carboxylic acids or their derivatives or vinyl esters, vinyl alkyl ethers, olefins, N-vinyl compounds, vinyl ketones, styrene, or vinyl aldehydes. Nonlimiting examples of such comonomers are reported in EP 0 392 735 and EP 0 392 783.

Polyazlactone copolymers may be prepared by bulk polymerization as reported in U.S. Pat. No. 4,695,608 to Engler et al. In addition, polyazlactone polymers and oligomers may be typically prepared by free radical polymerization of azlactone monomers, optionally with comonomers as described in U.S. Pat. No. 4,378,411.

Thermoplastic polymers are readily commercially available from a number of sources. While thermoplastic polymers may be melt blended at temperatures ranging from about 50° C. to about 350° C., it is preferred that thermoplastic polymers are melt blended at temperatures from about 75° C. to about 300° C., and more preferably from about 100° C. to about 300° C.

Melt blending of thermoplastic polymer with a polyazlactone homopolymer or copolymer may occur at temperatures which are required for the melting of the thermoplastic polymer. Because polyazlactone homopolymers generally do not degrade significantly at temperatures below about 275° C., there are no deleterious byproducts of the melt blending process. Preferably, to minimize discolorization, the melt blending should occur below about 210° C.

The temperature of melt blending must be at least at or above the glass transition temperature (Tg) of both the polyazlactone homopolymer and the thermoplastic polymer and preferably is at least about 25° C. above the Tg of amorphous or glassy polymers such as polystyrene or polymethylmethacrylate and at least about 10° C. above the melting point of semicrystalline polymers such as polyethylene and polypropylene.

Melt blending of polyazlactone homopolymers with a thermoplastic polymer may be done using a twin-screw extruder. As illustrated in FIG. 2, after homopolymerization of alkenyl azlactone, polyazlactone homopolymer (or other polyazlactone copolymer) in a pelletized form is introduced to extruder 30 from vessel 32. Thermoplastic polymer is introduced in pelletized form into extruder 30 from vessel 34. Vacuum ports 35 vent off volatiles. If thermoplastic polymer were introduced into the extruder 30 in solution, then vacuum ports 35 would vent off the solvent also. Gear pump 36 eliminates surging and produces a continuous strand of the blended composition. The blended composition is quenched in bath 37 which contains a cold (dry ice temperature) inert cooling fluid such as FLUORINERT heat transfer liquid (3M, St. Paul, Minn.). Finally, the cooled, blended composition is directed through pelletizer 38.

Alternatively, other conventional mixing processes used in the art, such as a Brabender mixer, may also be used.

The weight ratio of thermoplastic polymer to polyazlactone polymer may range from about 99.99:0.01 to about 50:50. Preferably, the weight ratio of thermoplastic polymer to azlactone polymer is about 95:5, when the azlactone polymer is azlactone homopolymer prepared according to the method reported in EP 0 392 735.

In addition to polyazlactone homopolymers, any of the polyazlactone copolymers and oligomers described in pending U.S. patent application Ser. No. 08/119,036 may be used in melt blending with thermoplastic polymer. These blends need not be compatible. However, the reactivity of incompatible blends with biologically active substances is not compromised by polymer blend incompatibility. Generally, the mixing conditions and temperature conditions for melt blending azlactone copolymers are similar to melt blending azlactone homopolymers.

To make polyazlactone blends suitable for further processing, the melt blending of the azlactone-modified thermoplastic composition should not adversely alter bulk properties of the thermoplastic polymer. Melt flow index is a key bulk property. The azlactone-modified composition may have a melt flow index (g/10 min.) ranging from within about 50% of the melt flow index of the thermoplastic polymer alone to within about 99% of the melt flow index of the thermoplastic polymer alone. Preferably, the melt flow index of the azlactone-modified composition is within about 75% of the melt flow index of the thermoplastic polymer alone.

After the azlactone graft or blend compositions are formed according to reported processes, these compositions may be formed into a microporous membrane. According to the schematically illustrated steps of FIG. 1, an azlactone thermoplastic composition is starve-fed from hopper 10 into extruder 14. The composition is formed into a melt-blend with a blending compound injected through port 12 in extruder 14.

Preferred blending compounds are typically solvents or mixtures of solvents which will form a homogeneous solution with the polymer at high temperatures and will form two phases when the homogeneous mixture is cooled below the crystalline temperature of the composition. For example, mineral oil is a preferred solvent because it is capable of forming a homogeneous solution with polyolefins at high temperatures but then forms two phases as the solution is cooled. The amount of blending compound which is mixed with the azlactone thermoplastic composition depends on the base polymeric resin. For example, the amount of mineral oil used to form a melt-blend of high density polyethylene is about 55–80 weight percent, for polypropylene and polymethylpentene the amount of mineral oil used to form a melt-blend is about 30–75 weight percent. If desired, a small amount of nucleating agent such as pigments and polysorbitol derivatives may be added to the melt-blend.

Extruder 14 is maintained at a temperature which is sufficient to form a homogenous melt of the composition and blending compound. Generally the temperature is set at a value which raises the temperature of the melt-blend above the melting temperature of the composition but which does not cause thermal degradation of the composition. If needed, extruder 14 may contain a static mixer, not shown, to ensure that a uniform, homogeneous melt-blend is obtained.

The extruder 14 is preferably configured so that when the melt-blend reaches a temperature greater than the melting point of the composition, the hot melt-blend is then extruded through die 16 onto cold roller or casting wheel 18. The temperature of casting wheel 18 is maintained at a temperature below the melting point of the polymer so that the melt-blend forms two phases on contact with the casting wheel. For polyolefins the casting wheel is typically maintained at a temperature of between 30–180° C. Alternative casting wheels, such as patterned wheels, may also be used.

As the melt-blend cools it separates into a two phase system, the blending compound in one phase and the polymer composition in a second phase. After the two phases are formed, the blending compound is then separated from the polymer in extractor 20. Extractor 20 preferably uses a solvent which is miscible with the blending compound and is also preferably a nonaqueous solvent. Suitable solvents include trichloroethane and fluorinated hydrocarbons as well as mixtures of fluorinated hydrocarbons. Preferably, the nonaqueous extraction solvent is removed and recycled after being used to extract the blending compound from the cooled melt-blend.

After the blending compound has been extracted, the resulting matrix is dried in dryer 22 at an elevated temperature to insure complete removal of all of the extraction solvent. The dried matrix is then oriented in at least the machine direction in orienter 24 and then is preferably oriented in the transverse direction in tenter 26. Typically, the dried matrix is stretched in both the machine and transverse directions up to about three-fold. The formation of the particles and connecting fibrils are generally formed during the orienting process. Although orientation in both machine and traverse directions to provide a biaxially oriented material is preferred, those of ordinary skill will understand that the dried matrix may be oriented in a single direction if desired.

After being oriented, the membrane is wound onto core 28. The azlactone-containing membrane is preferably stored in the absence of water or water vapor in order to prevent hydrolysis or degradation of the azlactone.

The azlactone thermally induced, phase separated membranes of the present invention may be further modified with a variety of biologically useful ligands. For example, ligands for use in the present membranes may include biologically active materials having azlactone-reactive, nucleophilic functional groups. Nonlimiting examples of biologically active materials are substances which are biologically, immunochemically, physiologically, or pharmaceutically active. Examples of biologically active substances include proteins, peptides, polypeptides, antibodies, antigenic substances, enzymes, cofactors, inhibitors, lectins, hormones, receptors, coagulation factors, amino acids, histones, vitamins, drugs, cell surface markers, and substances which interact with them.

Of the biologically active substances, proteins, enzymes and antigenic substances are desired for coupling to the present azlactone-modified membranes. Nonlimiting examples of proteins, enzymes, and antigenic substances include natural and recombinant Protein A, immunoglobulins such as rat, human, bovine, rabbit, and mouse, concanavalin A, bovine serum albumin, thyroglobulin, apoferritin, lysozyme, carbonic anhydrase, lipase, pig liver esterase, penicillin acylase, and bacterial antigen. Uses for immobilized proteins, enzymes and antigenic substances are reported in EP 0 392 735.

EXAMPLES

The following examples are provided to further illustrate the practice of this invention but should not be construed to limit the scope of the appended claims. In the examples, the physical characteristics of membranes prepared according to the described process where determined according to the following tests and procedures.

MEMBRANE TEST 1

Basis Weight ($g/m^2$)

1. Cut or punch out a 10×10 cm sample.
2. Weigh sample to ±0.001 g.
3. Multiply weight by 100 to give basis weight in $g/m^2$.

Thickness ($\mu$: microns)

1. Measure with low pressure caliper gauge.
2. Convert from mils to microns (1 mil=25.4 microns).

Density ($g/cm^3$)

1. Obtain basis weight and thickness values.
2. Divide basis weight by 10,000 to convert from $g/m^2$ to $g/cm^2$.
3. Divide micron thickness values by 10,000 to convert units from microns ($\mu$) to centimeters (cm).
4. Divide converted basis weight by the converted thickness to give density as $g/cm^3$.

MEMBRANE TEST 2

Water Wettability (Scale 1–5: #sec)

1. Punch out sample into a 47 mm diameter disk.
2. Fill a petri dish half full with water and add 10–15 drops of 1% (w/v) aqueous bromophenol blue indicator.
3. Using a stopwatch, determine the number of seconds (±0.1 s) required to wet-out the sample with the blue aqueous solution.
4. Use the following scale to determine the wetting characteristics of the membrane:
   1) Uniformly wets instantly (<1 sec),
   2) Uniformly wets slowly (report with time),
   3) Partially wets instantly (<1 sec),
   4) Partially wets slowly (report with time),
   5) Hydrophobic; does not wet at all.

MEMBRANE TEST 3

Handleability (#C, #P)

1. Punch out a 47 mm diameter disk from sample.
2. Place disk in the palm of hand and crumple it into a ball for a period of 10 seconds.

3. Flatten the disk out and determine the number of cracks (#C) and pieces (#P) visible to the naked eye.

Tensile and Elongation

1. Determine tensile and elongation using ASTM D882-83 for both the machine (MD) and transverse (TD) directions.

MEMBRANE TEST 4

Water Flow Rate (cc/min)
1. Punch out sample into a 47 mm diameter disk.
2. If the sample is water wettable (hydrophilic), go to step 3. If the sample did not wet-out (hydrophobic), immerse it in ethanol and then rinse it with water directly before going to step 3.
3. Place sample into the Nucleopore Water Flow Chamber (Model 6005087, Nucleopore, Pleasanton, Calif.) and seal.
4. Fill chamber with 200 ml of distilled, deionized water.
5. Set pressure gauge to 10 psi.
6. Preweigh an empty beaker.
7. Open pressure valve to chamber and purge 25 ml of water into a waste beaker.
8. Transfer outlet hose to preweighed beaker, start timer, collect 100 ml of water, remove/replace preweighed beaker, and stop the timer.
9. Reweigh the beaker with the collected≅100 ml and determine the weight of the collected water.
10. Use the following equation to determine the water flow rate:

$$W.F.R. = \frac{(X \text{ g } H_2O)(1 \text{ ml}/g)(1 \text{ cc}/ml)}{(Y \text{ sec})(1 \text{ min.}/60 \text{ sec})}$$

Water Flux at 10 psi (cc/min·cm$^2$)
1. Obtain a water flow rate value.
2. Divide the water flow rate value by the disk area (17.35 cm$^2$) to give the membrane's water flux value in units of cc/min·cm$^2$.

Permeance (cc/min·cm$^2$·psi)
1. Calculate the water flux value of the membrane.
2. Divide the water flux value by 10 psi in order to normalize it with respect to pressure to give the permeance in units of cc/min·cm$^2$·psi.

Permeability Coefficient (cc·cm/min·cm$^2$·psi)
1. Calculate the permeance of the membrane.
2. Multiply the permeance value by the thickness (cm) of the membrane in order to obtain its permeability coefficient.

MEMBRANE TEST 5

Pore Size ($\mu$: microns)
The average pore size of the membrane sample was determined using ASTM F316-86 (Bubble Point).

Porosity (% Void)
Approximate the % void (porosity×100) of the sample by using the following equation:

$$Porosity = 1 - \frac{Membrane\ Density}{Bulk\ Polymer\ Density}$$

% Void = Porosity × 100

Example 1

Azlactone-Graft/High Density Polyethylene Membrane

The hopper of a 1 and ¼ inch (32 mm) single screw extruder with seven independently controlled zones (Killion KN-125; Cedar Grove, N.J.) was starve fed with pellets of high density polyethylene (HDPE, Dow 8345N, Midland, Mich.). A solution containing initiator (50:50 weight:weight LUPERSOL 101 (2,5-dimethyl-2,5-di-(t-butylperoxy) hexane):LUPERSOL 130 (2,5-dimethyl-2,5-di-(t-butylperoxy)hex-3-yne); AtoChem, Farmindale, N.Y.) in tetrahydrofuran (50:50) was dripped under a nitrogen atmosphere into the extruder feed throat at a rate to provide 0.1 wt. % of initiator based on polymer weight. Monomeric 2-ethenyl-4,4-dimethyl-2-oxazoline-5-one (VDM, available from SNPE, Inc, Princeton, N.J.) was fed in a port between barrel zones 3 and 4. The extruder speed was set at 75 rpm and the feed rates were adjusted to provide a total flow rate of 80 g/minute. The feed throat was water cooled. Zones 1–7 were heated; Zone 1 at 150° C., Zone 2 at 160° C., Zone 3 at 170° C., Zones 4 and 5 at 180° C., Zones 6 and 7 at 190° C., and the end adaptor at 190° C. The extrudate was quenched in a bath of fluorinated coolant (FLUORINERT heat transfer liquid, 41-2700-3246-3, available from 3M, St. Paul, Minn.) and dry ice; then pelletized and stored under dry nitrogen. The resulting grafted copolymer contained 3% by weight of VDM.

In the second stage, the grafted copolymer was introduced into the hopper of a 25 mm twin screw extruder (Model ZE 25, Berstorff, Hannover, Germany) fitted with a flat film die. The grafted copolymer was fed into the extruder at a rate of 3.2 lb (1.5 Kg) per hour and the extruder operated at a 8 lb (3.6 Kg) per hour throughput rate. Mineral oil (SUPERLA Mineral Oil 31-USP, Amoco, Chicago, Ill.) was introduced into the extruder through an injection port at a rate to provide a blend of 40% by weight of grafted copolymer and 60% by weight of mineral oil. The mixture was cast as a transparent film onto a smooth casting wheel at a temperature of 32° C. and a casting speed of 1.8 m/min. The extruder zone temperatures were as follows: Zone 1 at 196° C., Zones 2 and 3 at 265° C., Zone 4 at 216° C., Zones 5–9 at 165° C. The film was washed in a metal frame with 1,1,1-trichloroethane for 15 minutes then air-dried at ambient temperature in a vented hood. It was biaxially stretched at 1.5 times its original length/width with a film stretcher (TM LongStretcher, Somerville, N.J.) at 74° C. The resulting film was stored in a desiccator. The physical characteristics of this membrane are listed in Table 1.

Example 2

Azlactone-Graft/High Density Polyethylene Membrane

Using the method of Example 1, a copolymer containing 5% by weight of VDM grafted onto high density polyethylene (Dow 8345N, Midland, Mich.) was prepared. The resulting graft copolymer was then made into a film using the procedures described in Example 1 and stored in a desiccator. The physical characteristics of this membrane are listed in Table 1.

Example 3

Azlactone-Graft/Polypropylene Membrane

Using the general method of Example 1 except that a twin screw extruder (Model ZE-40x40D, Berstorff, Hannover, Germany) was used and the processing zones were maintained at 180° C., a copolymer containing 3% by weight of VDM grafted onto polypropylene (PP, PRO-FAX 6723, HIMONT, Willmington, Del.) was prepared. Using the general method of Example 1 with only 50% by weight mineral oil, 49.5% by weight VDM grafted polypropylene and 0.5% by weight of a polyol acetal nucleating agent (MILLAD 3905, Milliken Chemical Spartanburg, S.C.) based on polymer, this copolymer was made into a film, washed with HCFC-123 (VERTREL 423, DuPont, Willington, Del.) then stored in a desiccator without orientation. The physical characteristics of this membrane are listed in Table 1.

Example 4

Azlactone-Graft/Polymethylpentene Membrane

Using the general method of Example 1, except that a twin screw extruder (Model ZE-40x40D, Bertstorff, Hannover, Germany) was used with the processing zones maintained at 260° C. and the initiator system was 50% by weight of 25:25:50 LUPERSOL 101:LUPERSOL 130:cumene hydroperoxide (AtoChem, Farmington, N.Y.) in tetrahydrofuran, a copolymer containing 3% by weight of VDM grafted onto polymethylpentene (TPX, Mitsui Petrochemical Industries, Ltd., Tokyo, Japan) was prepared. Using the general method of Example 1, this copolymer was made into a film at 232° C., washed with HCFC-123 (Vertrel 423, DuPont, Willington, Del.), biaxially stretched at 138° C., and stored in a desiccator. The physical characteristics of this membrane are listed in Table 1.

amps 31, volts 108, zone temperatures: Zone 1 - 25° C., Zones 2–4 - 180° C., Zone 5 - 170° C., Zone 6 - 180° C., Zone 7 - 177° C., Zone 8 - 125° C., Zone 9 - 195° C., Zone 10 - 200° C., Zone 11 - 205° C.). The polyolefin, high density polyethylene (9255 Hoechst) or polypropylene (6723 HiMont Pro-Fax), was solids fed into the feed throat of the extruder using a K-tron weigh feeder. Also fed into the feed throat of the extruder was a 35% solids solution of azlactone homopolymer in tetrahydrofuran using a Gilson High Pressure Liquid Chromatography Pump. Flow rates of the pump were adjusted to yield 2.5% azlactone homopolymer (8.1 ml/min) and 5.0% azlactone homopolymer (16.2 ml/min) in the polyolefin to produce 15 lb/hr of the blended material. The weigh feeder was also set at 15 lb/hr. A vacuum port was used at zone 9 of the extruder to pull off any volatiles in the material. The blend was extruded as a strand into a cold (dry ice) FLUORINET liquid solution (3M, St. Paul, Minn.) where the strand was quenched and pelletized using a Conair pelletizer (Con Air Group of Bay City, Mich.).

Example 6

Preparation of Polyazlactone/High Density Polyethylene Membranes and Polyazlactone/Polypropylene Membranes Using the general method of Example 1 (except that a twin screw extruder was used, Model ZE-40X40D,

TABLE 1

Azlactone-Graft-Polyolefin Membrane Properties

| Property | 3 wt. % VDM-g-HDPE 1.5 × 1.5 stretch Example 1 | 5 wt. % VDM-g-HDPE 1.5 × 1.5 stretch Example 2 | 3 wt. % VDM-g-PP 0 × 0 stretch Example 3 | 3 wt. % VDM-g-TPX 1.5 × 1.5 stretch Example 4 |
|---|---|---|---|---|
| Azlactone Conc. (wt. %) | 3 | 5 | 3 | 3 |
| Bound Protein ($\mu$g rPA/cm$^2$) | 150.0 (PBS) 150.3 (SO$_4$) | 143.8 (PBS) 104.4 (SO$_4$) | 70.2 (SO$_4$) | 60.3 (SO$_4$) |
| % SDS Resistance | 49.5 (PBS) 49.4 (SO$_4$) | 46.4 (PBS) 50.6 (SO$_4$) | 28.3 (504) | 6.6 (SO$_4$) |
| Coupled Protein ($\mu$g rPA/cm$^2$) | 74.1 (PBS) 74.4 (SO$_4$) | 66.7 (PBS) 52.8 (SO$_4$) | 20.4 (SO$_4$) | 3.9 (SO$_4$) |
| Basis Weight (g/m$^2$) | 7.0 | 7.2 | 75.7 | 34.9 |
| Thickness ($\mu$m) | 76.2 | 76.2 | 124.5 | 119.4 |
| Density (g/cm$^3$) | 0.092 | 0.094 | 0.608 | 0.292 |
| Wettability (scale 1–5) | 5 | 5 | 5 | 5 |
| Handleability (#C;#P) | 0C, 1P | 0C, 1P | 10C, 5P | 7C, IP |
| MD Tensile (psi) | 665 | 666 | 633 | 785 |
| TD Tensile (psi) | 696 | 675 | 586 | 817 |
| MD Elongation (%) | 116 | 118 | 35 | 11 |
| TD Elongation (%) | 81 | 92 | 43 | 23 |
| Water Flux (cc/min. · cm$^2$) | 1.54 | 0.37 | 0 | 2.91 |
| Permeability Coef. (cc · cm/min. · cm$^2$ · psi) | 0.0012 | 0.0003 | — | 0.0410 |
| Max. Pore Size ($\mu$m) | 0.24 | 0.17 | <0.10 | 0.48 |
| Porosity (% Void) | 90.4 | 90.1 | 32.7 | 67.7 |

PBS — phosphate buffered solution
SO$_4$ — sulfate buffered solution

Example 5

Polyazlactone/High Density Polyethylene Blends and Polyazlactone/Polypropylene Blends A 35% solids solution of azlactone homopolymer (solid powder having an average number molecular weight of about 11,000 prepared by solution polymerization of VDM (SNPE) with 0.5 wt. % azobisisobutyronitrile (VAZO 64) in tetrahydrofuran) in tetrahydrofuran was blended with polyolefin in a corotating twin screw extruder (Model ZE-40X40D, Bertstorff, Hannover, Germany; rpm 109, Bertstorff, Hannover, Germany having processing temperature zones as follows: Zone 1 - 248° C., Zone 2 - 271° C., Zone 3 - 271° C., Zone 4 - 248° C., and Zone 5 - 177° C.) the blended azlactone compositions were made into films. In addition, when polypropylene was the base polymer, the weight percent of blended polymer was 35 wt. % and the weight percent of mineral oil was 65 wt. %. The physical characteristics of the blended azlactone films are listed in Table 2.

TABLE 2

Azlactone-Blend-Polyolefin Membrane Properties

| Property | HDPE Control 1.5 × 1.5 stretch | 2.5 wt. % VDM-b-HDPE 1.5 × 1.5 stretch | 2.5 wt. % VDM-b-HDPE 2.25 × 2.25 stretch | 5 wt. % VDM-b-HDPE 1.5 × 1.5 stretch | 5 wt. % VDM-b-HDPE 2.25 × 2.25 stretch | PP Control 0 × 0 stretch | 2.5 wt. % VDM-b-PP 1.5 × 1.5 stretch | 5.0 wt. % VDM-b-PP 0 × 0 stretch |
|---|---|---|---|---|---|---|---|---|
| Polyazlactone Conc. (wt. %) | 0 | 2.5 | 2.5 | 5.0 | 5.0 | 0 | 2.5 | 5.0 |
| Bound Protein ($\mu$g rPA/cm$^2$) in SO$_4$ | 66.7 | 62.2 | 75.1 | 47.4 | 57.7 | 130.5 | 170.0 | 159.3 |
| % SDS Resistance | 6.5 | 6.3 | 4.4 | 12.3 | 8.5 | 1.6 | 4.2 | 11.2 |
| Coupled Protein ($\mu$g rPA/cm$^2$) in SO$_4$ | 4.3 | 3.9 | 3.2 | 5.8 | 4.9 | 2.2 | 7.3 | 17.8 |
| Basis Weight (g/m$^2$) | 39.5 | 84.6 | 38.2 | 89.6 | 39.4 | 46.7 | 68.0 | 140.2 |
| Thickness ($\mu$m) | 94.0 | 182.4 | 114.3 | 188.0 | 124.5 | 94.0 | 268.2 | 355.6 |
| Density (g/cm$^3$) | 0.420 | 0.463 | 0.456 | 0.477 | 0.316 | 0.497 | 0.253 | 0.394 |
| Wettability (scale 1–5) | 5 | 5 | 5 | 5 | 5 | 5 | 5 | 5 |
| Handleability (#C;#P) | 0C, 1P | 0C, 1P | 0C, 1P | 0C, 1P | 1C, 1P | 0C, 1P | 0C, 1P | >10C, >10P |
| MD Tensile (psi) | 2738 | 1844 | 2529 | 1688 | 2120 | 2781 | 404 | 225 |
| TD Tensile (psi) | 2414 | 1846 | 2236 | 1842 | 2008 | 2403 | 458 | 176 |
| MD Elongation (%) | 1683 | 1565 | 796 | 1356 | 747 | 762 | 18 | 19 |
| TD Elongation (%) | 1473 | 1485 | 835 | 1418 | 762 | 616 | 28 | 15 |
| Water Flux (cc/min. · cm$^2$) | 0.44 | 0.23 | 0.91 | 0.15 | 0.80 | 0.67 | 1.93 | 0 |
| Permeability Coef. (cc · cm/min. · cm$^2$ · psi) | 0.0004 | 0.0004 | 0.001 | 0.0003 | 0.001 | 0.0006 | 0.0005 | 0 |
| Max. Pore Size ($\mu$m) | 0.14 | 0.12 | 0.19 | 0.12 | 0.17 | 0.15 | 1.16 | 0.73 |
| Porosity (% Void) | 56.0 | 52.2 | 65.0 | 50.0 | 66.9 | 46.6 | 72.7 | 57.6 |

Example 7

Comparative Example

Three control samples were prepared in a similar fashion to the second stage of Example 1. The three base resins (high density polyethylene 8354N: Dow; polypropylene: Profax 6723: HiMont; polymethylpentene: Mitsui Petrochemical Industries, Ltd., Tokyo, Japan) were not grafted, but merely processed into membranes. In the case of polypropylene, a Millad nucleating agent (0.5 weight % based on polymer) and 50 weight % of mineral oil in place of the VDM grafted resins, were used. The physical properties of the three membranes which did not contain azlactone are listed in Table 3.

The ability of the membranes described in Examples 1–4 and 6 to bind protein was determined using the following procedure. Protein A (Repligen, Cambridge, Mass.) was radioiodonated with NaI$^{125}$ using Iodo-Beads (Pierce Chemical Co., Rockford, Ill.) and diluted to give a specific radioactivity of 4900–5800 cpm/$\mu$g of protein dissolved in buffer with a final protein concentration of 250 $\mu$g/ml. Two different buffers were employed. The PBS buffer contained 25 mM sodium phosphate and 150 mM sodium chloride with a pH of 7.5. The sulfate buffer contained 25 mM sodium phosphate and 1.5 M sodium sulfate with a pH of 7.5. Discs (8 mm diameter) were punched from each film using a standard office paper punch. Each disc was placed in a 2.0 ml polypropylene microfuge tube then incubated with 200 $\mu$L of Protein A solution for 2 hours at ambient temperature with rocking. Each blend and control were run in triplicate. After 2 hours the protein solution was removed and unreacted azlactone was inactivated by incubating the disc with 1.0 M ethanolamine (500 $\mu$L solution in 25 mM sodium phosphate, pH 9.0) for 1 hour with rocking. All discs were rinsed for a minimum of 15 minutes with 500 $\mu$L of the PBS buffer. Bound radioactivity was determined with a Packard Gamma Scintillation Spectrometer (Model 5230; Packard Instruments, Downers Grove, Ill.). Following the initial radioactivity determination, the discs were incubated with 500 $\mu$L of a 1% aqueous solution of sodium dodecyl sulfate (SDS) for 4 hours at 37° C. The discs were rinsed 3 times with warm SDS solution and the residual radioactivity was determined. SDS is a protein denaturing detergent and serves to remove adsorbed (as opposed to covalently coupled) protein from the film. The protein binding capabilities of the membranes are listed in Tables 1, 2 and 3 are summarized in Tables 4 and 5.

TABLE 3

Polyolefin Membrane Properties

| Property | HDPE Control | PP Control | TPX Control |
|---|---|---|---|
| Azlactone Conc. (wt. %) | 0 | 0 | 0 |
| Bound Protein ($\mu$g rPA/cm$^2$) | 138.0 (PBS) 119.9 (SO$_4$) | 138.0 (PBS) 119.9 (SO$_4$) | 69.4 (SO$_4$) |

TABLE 3-continued

Polyolefin Membrane Properties

| Property | HDPE Control | PP Control | TPX Control |
|---|---|---|---|
| % SDS Resistance | 2.4 (PBS) | 2.4 (PBS) | 1.1 (SO$_4$) |
|  | 2.2 (SO$_4$) | 2.2 (SO$_4$) |  |
| Coupled Protein | 3.3 (PBS) | 3.3 (PBS) | 0.8 (SO$_4$) |
| ($\mu$g rPA/cm$^2$) | 2.6 (SO$_4$) | 2.6 (SO$_4$) |  |
| Basis Weight (g/m$^2$) | 8.0 | 8.0 | 32.3 |
| Thickness ($\mu$m) | 76.1 | 76.1 | 114.3 |
| Density (g/cm$^3$) | 0.105 | 0.105 | 0.283 |
| Wettability (scale 1–5) | 5 | 5 | 5 |
| Handleability (#C;#P) | 0C, 1P | 0C, 1P | 0C, 1P |
| MD Tensile (psi) | 682 | 682 | 1104 |
| TD Tensile (psi) | 765 | 765 | 942 |
| MD Elongation (%) | 153 | 153 | 25 |
| TD Elongation (%) | 120 | 120 | 26 |
| Water Flux (cc/min. · cm$^2$) | 1.10 | 1.10 | 1.40 |
| Permeability Coef. (cc · cm/min. · cm$^2$ · psi) | 0.0008 | 0.0008 | 0.0816 |
| Max. Pore Size ($\mu$m) | 0.18 | 0.18 | 0.37 |
| Porosity (% Void) | 89.0 | 89.0 | 68.8 |

PBS — phosphate buffered solution
SO$_4$ — sulfate buffered solution

TABLE 4

Protein Binding Capacity

| Property | 3 wt. % VDM-g-HDPE Example 1 | 5 wt. % VDM-g-HDPE Example 2 | 3 wt. % VDM-g-PP Example 3 | 3 wt. % VDM-g-TPX Example 4 | HDPE Control | PP Control | TPX Control |
|---|---|---|---|---|---|---|---|
| Bound Protein | 150.0 (PBS) | 143.8 (PBS) | 70.2 (SO$_4$) | 60.3 (SO$_4$) | 138.0 (PBS) | 138.0 (PBS) | 69.4 (SO$_4$) |
| ($\mu$g rPA-cm2) | 150.3 (SO$_4$) | 104.4 (SO$_4$) |  |  | 119.9 (SO$_4$) | 119.9 (SO$_4$) |  |
| % SDS Resistance | 49.5 (PBS) | 46.4 (PBS) | 28.3 (SO$_4$) | 6.6 (SO$_4$) | 2.4 (PBS) | 2.4 (PBS) | 1.1 (SO$_4$) |
|  | 49.4 (SO$_4$) | 50.6 (SO$_4$) |  |  | 2.2 (SO$_4$) | 2.2 (SO$_4$) |  |
| Coupled Protein | 74.1 (PBS) | 66.7 (PBS) | 20.4 (SO$_4$) | 3.9 (SO$_4$) | 3.3 (PBS) | 3.3 (PBS) | 0.8 (SO$_4$) |
| ($\mu$g rPA/cm2) | 74.4 (SO$_4$) | 52.8 (SO$_4$) |  |  | 2.6 (SO$_4$) | 2.6 (SO$_4$) |  |

PBS — phosphate buffered solution
SO$_4$ — sulfate buffered solution

TABLE 5

Protein Binding Capacity

| Property | 2.5 wt. % VDM-b-HDPE 1.5 × 1.5 stretch Example 6 | 2.5 wt. % VDM-b-HDPE 1.5 × 1.5 stretch Example 6 | 5 wt. % VDM-b-HDPE 1.5 × 1.5 stretch Example 6 | 5 wt. % VDM-b-HDPE 2.5 × 2.5 stretch Example 6 | 2.5 wt. % VDM-b-PP 1.5 × 1.5 stretch Example 6 | 5 wt. % VDM-b-PP No stretch Example 6 | HDPE Control 1.5 × 1.5 stretch | PP Control No stretch |
|---|---|---|---|---|---|---|---|---|
| Bound Protein ($\mu$g rPA-cm2) | 62.2 (SO$_4$) | 75.1 (SO$_4$) | 47.4 (SO$_4$) | 57.7 (SO$_4$) | 170.0 (SO$_4$) | 159.3 (SO$_4$) | 66.7 (SO$_4$) | 130.5 (SO$_4$) |
| % SDS Resistance | 6.3 (SO$_4$) | 4.4 (SO$_4$) | 12.3 (SO$_4$) | 8.5 (SO$_4$) | 4.2 (SO$_4$) | 1.2 (SO$_4$) | 6.5 (SO$_4$) | 1.6 (SO$_4$) |
| Coupled Protein ($\mu$g rPA/cm2) | 3.9 (SO$_4$) | 3.2 (SO$_4$) | 5.8 (SO$_4$) | 4.9 (SO$_4$) | 7.3 (SO$_4$) | 17.8 (SO$_4$) | 4.3 (SO$_4$) | 2.2 (SO$_4$) |

PBS — phosphate buffered solution
SO$_4$ — sulfate buffered solution

We claim:

1. A microporous material consisting essentially of a crystallizable extrusion blended azlactone thermoplastic composition having an azlactone functional polymer blended with a thermoplastic polymer, wherein the microporous material has an internal structure characterized by a multiplicity of spaced, randomly disposed, non-uniformly shaped, equiaxed particles of the blended azlactone thermoplastic composition, adjacent particles throughout the material being separated from one another to provide the material with a network of interconnected micropores and being connected to each other by a plurality of fibrils of the blended azlactone thermoplastic composition.

2. A membrane having a network of spaced, randomly disposed, non-uniformly shaped equiaxed particles interconnected with a plurality of fibrils to provide a network of interconnected micropores consisting essentially of polyvinyl dimethylazlactone homopolymer extrusion blended with a crystallizable thermoplastic polymer.

3. A method of making an azlactone-modified thermally induced, phase separated membrane comprising a) forming an azlactone-modified composition, b) forming a membrane by mixing the azlactone-modified composition of a) with a blending compound at an elevated temperature to give a homogeneous melt-blend, c) forming a two-phase article from the melt-blend, d) removing the blending compound from the two-phase article, and e) orienting the article in at least one direction to give an oriented membrane;

wherein the azlactone-modified composition is a crystallizable extrusion blended azlactone thermoplastic composition of claim 1.

4. A method of making an azlactone-modified thermally induced, phase separated membrane comprising a) forming an azlactone-modified composition, b) forming a membrane by mixing the azlactone-modified composition of a) with a blending compound at an elevated temperature to give a homogeneous melt-blend, c) forming a two-phase article from the melt-blend, d) removing the blending compound from the two-phase article, and e) orienting the article in at least one direction to give an oriented membrane;

wherein the azlactone polymeric material consists essentially of a crystallizable blend of a thermoplastic polymer with a homopolymer or copolymer of an alkenyl azlactone monomer selected from the group consisting of

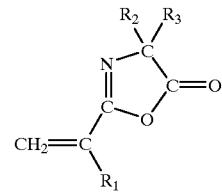

wherein $R^1$ is hydrogen or methyl and wherein $R^2$ and $R^3$ are, independently, alkyl having 1–14 carbon atoms, arenyl having 6–26 carbon atoms and 0–3 sulfur, nitrogen, and nonperoxidic oxygen atoms, or $R^2$ and $R^3$ taken together with the carbon atom to which they are attached form a carbocyclic ring having 4–12 carbon atoms.

* * * * *